(12) United States Patent
Sheikh

(10) Patent No.: US 8,484,885 B2
(45) Date of Patent: Jul. 16, 2013

(54) FISHING LURE

(75) Inventor: Kamran Nazar Sheikh, Sherwood Park (CA)

(73) Assignee: Kamooki Lures Ltd., Sherwood Park, Alberta (CA)

( * ) Notice: Subject to any disclaimer, the term of this patent is extended or adjusted under 35 U.S.C. 154(b) by 270 days.

(21) Appl. No.: 13/048,499

(22) Filed: Mar. 15, 2011

(65) Prior Publication Data

US 2011/0225871 A1      Sep. 22, 2011

(30) Foreign Application Priority Data

Mar. 17, 2010  (CA) .................................... 2697064

(51) Int. Cl.
*A01K 85/00*  (2006.01)
(52) U.S. Cl.
USPC ....................................... 43/42.39; 43/42.22
(58) Field of Classification Search
USPC ...................................... 43/42.39, 42.22, 42
See application file for complete search history.

(56) References Cited

U.S. PATENT DOCUMENTS

| | | | | |
|---|---|---|---|---|
| 3,753,310 A * | 8/1973 | Werner | ................. | 43/42.39 |
| 4,653,212 A * | 3/1987 | Pixton | ................. | 43/4.5 |
| 4,713,907 A * | 12/1987 | Dudeck | ................. | 43/42.39 |
| 5,396,728 A | 3/1995 | Weber et al. | | |
| 5,490,347 A * | 2/1996 | Conley | ................. | 43/42.47 |
| 5,535,540 A * | 7/1996 | Crumrine | ................. | 43/42.09 |
| 5,822,912 A | 10/1998 | Kato et al. | | |
| 6,035,574 A * | 3/2000 | Ware | ................. | 43/42.06 |
| 6,581,320 B1 * | 6/2003 | Hnizdor | ................. | 43/42.39 |
| 7,415,793 B1 * | 8/2008 | Borchardt | ................. | 43/42.36 |
| 7,743,550 B2 * | 6/2010 | Huddleston | ................. | 43/42.22 |
| 7,748,157 B1 * | 7/2010 | Hellmann | ................. | 43/42.39 |
| 7,827,731 B2 * | 11/2010 | Gibson | ................. | 43/42.39 |
| 2005/0204607 A1 * | 9/2005 | Nichols | ................. | 43/42.37 |
| 2011/0214333 A1 * | 9/2011 | Travieso | ................. | 43/42.39 |

* cited by examiner

*Primary Examiner* — Christopher P Ellis
(74) *Attorney, Agent, or Firm* — Welsh Flaxman & Gitler LLC

(57) ABSTRACT

A fishing lure is provided which is adapted to simulate the behavior of a minnow at rest. Specifically, the new and improved fishing lure described herein is equipped with a pedestal on its bottom, whereby the pedestal is adapted to make contact with a bottom surface at a single contact point. The single contact point is aligned with the lure's center of balance, such that when the lure rests on the bottom surface it has a tendency to remain balanced on the single contact point. This allows the lure to be wobbled by the water turbulence, thereby imitating the behavior of a minnow at rest.

7 Claims, 4 Drawing Sheets

FISHING LURE

BACKGROUND OF THE INVENTION

1. Field of the Invention

The present invention relates to fishing lures. In particular, the present invention relates to fishing lures adapted to simulate the behavior of bait fish such as a minnow.

2. Description of the Related Art

It is well known that it is desirable to use artificial baits when fishing. It is also well known that such artificial baits are more efficient the more they resemble the actual live bait they are meant to imitate, whether in appearance or in behavior. Accordingly, the prior art has several examples of fishing lures designed to imitate the appearance and behavior of live bait. As the minnow is a very commonly used bait, many prior art lures attempt to reproduce the appearance and behavior of the minnow.

One such prior art lure is described in U.S. Pat. No. 5,396,728 to Weber. Weber teaches a fishing lure shaped to resemble a minnow and to produce a wiggling motion when pulled through the water. The lure according to Weber is weighted in the head portion, such that as it settles, the lure orients itself with the head lower than the remainder of the body.

The use of weights in lures is also well known and allows for different lures to behave differently based on the distribution of the weights. An example of such a lure is described in U.S. Pat. No. 5,822,912 to Kato et al., and is made by providing two hollow guide sections within the body of the lure, in which spherical weights are allowed to move. This arrangement is meant to improve the distances achieved when casting, as well as placing the lure's center of gravity near the back end while in the water, thereby stabilizing the lure's movements.

However, none of the prior art fishing lures effectively imitate the behavior of a bait fish at rest. Weber, discussed above, does teach to place weights in the head portion such that, when at rest, the head is lower than the remainder of the body. Hence, Weber teaches how to achieve the proper orientation of a fishing lure at rest, but is silent on how to achieve the wobbling motion of the lure while it is not being pulled through water.

Accordingly, there is a need for a fishing lure which not only orients itself properly while at rest, but which also reproduces the multidirectional motion of a bait fish while at rest. Obviously, the term "at rest" as used herein means that the fishing lure is not being pulled through the water via the fishing line, and does not mean a completely motionless lure.

SUMMARY OF THE INVENTION

The present invention solves the above-noted deficiencies of the prior art by providing a fishing lure with a center of balance aligned with a single contact point, wherein the fishing lure is adapted to contact the ground only at the single contact point. Typically, the contact point is positioned on the belly side of the fishing lure, if the lure is given the appearance of an actual bait fish.

According to one aspect of the present invention, there is provided a fishing lure comprising a body, wherein the body has a front end, a back end, a top side, and a bottom side, a hook, attached to said body, fishing line attachment means, attached to the body, a pedestal, attached to said bottom side of said body, wherein said pedestal terminates at its lowermost point into a single contact point; wherein said body is composed of a combination of buoyant and non-buoyant material, such that the lure's center of balance is aligned with said single contact point.

While the present invention may sometimes be described with reference to minnows, the present invention is not so limited. In particular, the present invention may be adapted to imitate any kind of bait fish and reference to minnows herein are only provided as examples.

DETAILED DESCRIPTION OF THE INVENTION

Figure 4:
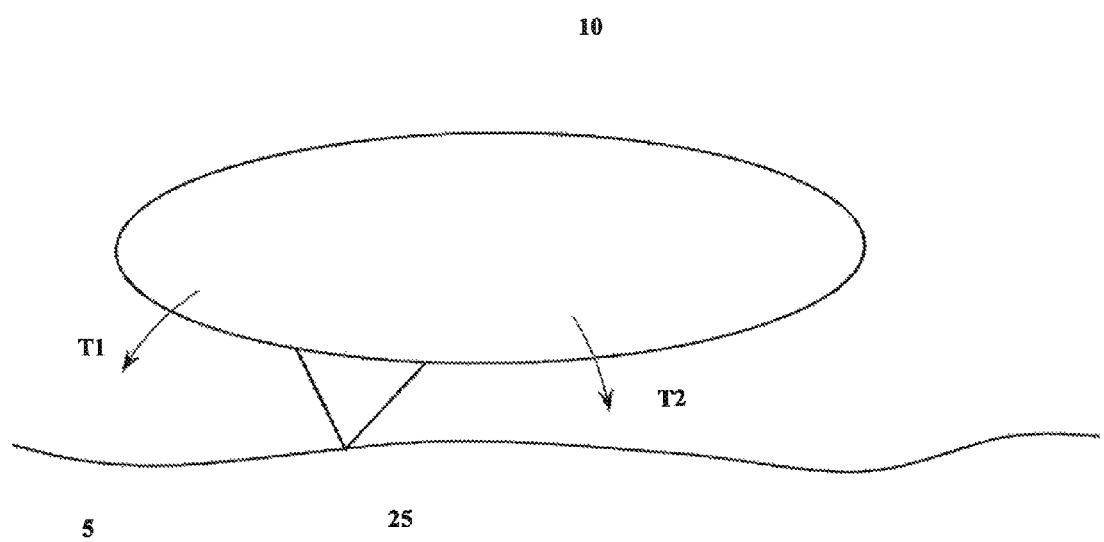
FIG. 4 is a side view of a cross-section of a depiction of the center of balance of the lure.

An important concept of the present invention is the "center of balance" of the lure. To the extent that the term "center of balance" requires clarification, it is hereby defined with reference to FIG. 4. A body 10 is in contact with a surface 5 at a point 25. Arrows T1 and T2 are representations of the torque which results from gravity, based on an axis of rotation at the contact point 25. Contact point 25 is aligned with the "center of balance" of body 10 when T1 is equal to T2.

Figure 1:
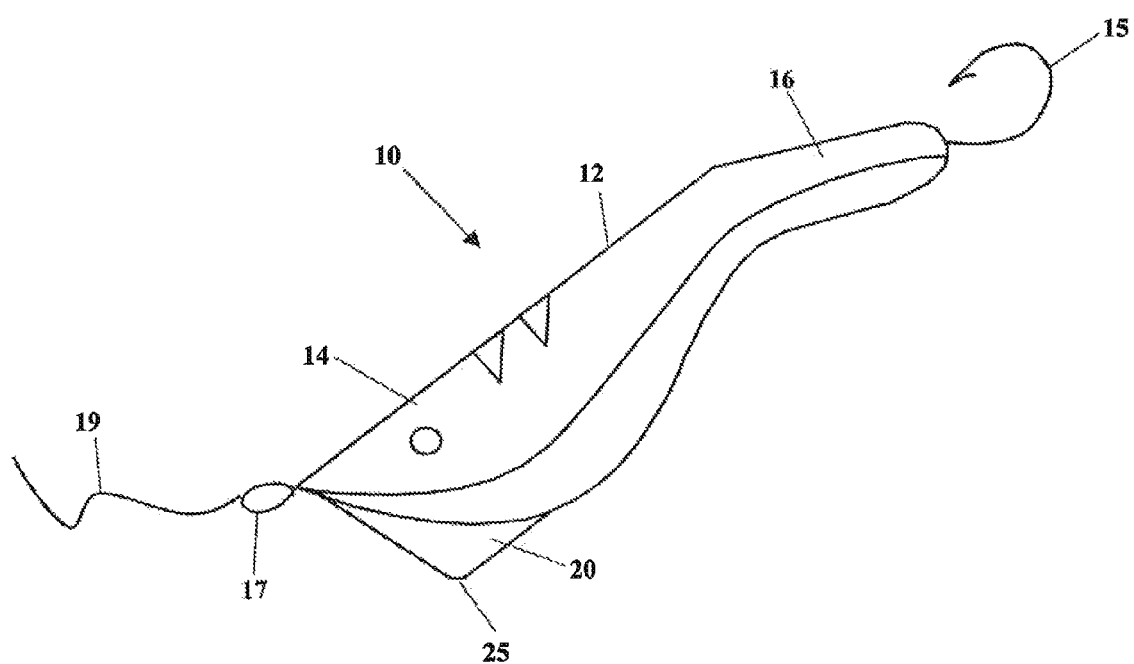
FIG. 1 is a side view of a fishing lure according to one embodiment of the present invention.

Reference is made to FIG. 1, wherein an exemplary embodiment of the present invention is shown. The lure, generally indicated by the numeral 10, has a body 12 comprising a head portion 14 and a tail portion 16. A hook 15 is preferably placed near the tail portion 16, and curving upwardly such that the tip points towards the head portion 14, although any hook arrangement known in the art is also considered within the scope of the present invention. The lure is also preferably equipped with an eyelet 17 near the head portion 14, which allows the lure to be safely connected to a fishing line 19.

The lure 10 also has a pedestal 20, shown in FIG. 1 in the shape of an inversed pyramid, with a contact point 25. It will be appreciated that other shapes for the pedestal are also suitable, as long as the pedestal contacts the ground at a single point. As will be discussed in greater detail below, the lure's center of balance is lined up vertically with the contact point 25. This feature allows the lure to remain substantially at rest with only the contact point 25 touching the ground. In turn, this allows the naturally occurring turbulence in the water to impart multi-directional wobbling to the lure, with the contact point 25 effectively acting as a pivot point.

Figure 2:
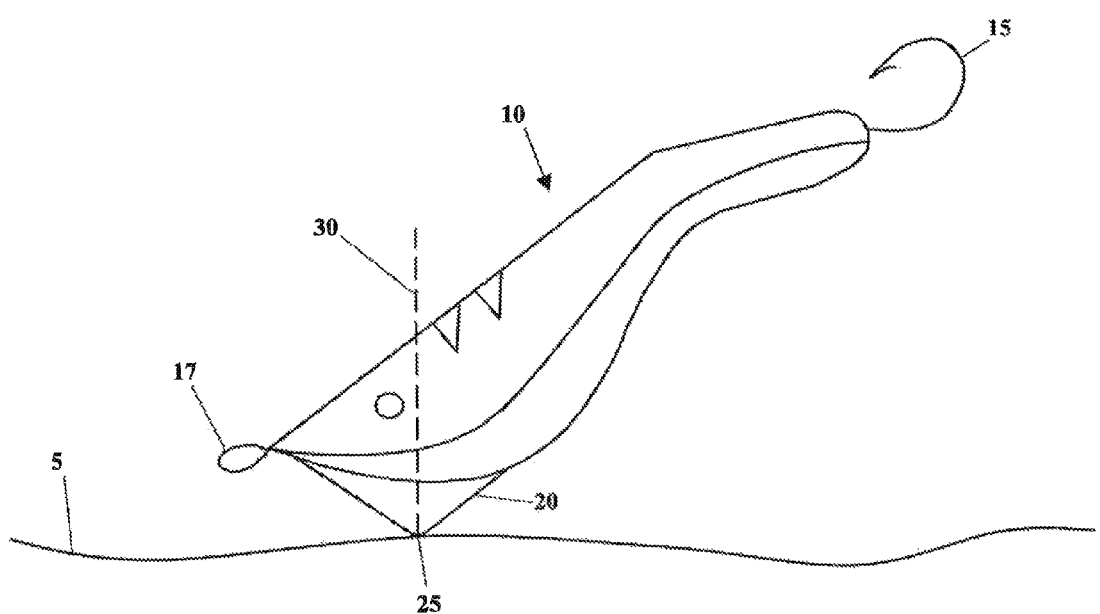
FIG. 2 is a side view of a fishing lure according to one embodiment of the present invention.

This is shown more clearly in FIG. 2, whereby the vertical axis of the lure's center of balance is identified by numeral 30. Also shown in FIG. 2 is the bottom surface 5.

To achieve the sought-after behavior, namely to have the fishing lure 10 stand in equilibrium on the bottom surface 5 with a single contact point, the single contact point must correspond to the lure's center of balance. In turn, in order to achieve a center of balance at a given position, a combination of buoyant and non-buoyant materials is used in the construction of the lure body 12 as will be described below in greater detail with reference to FIG. 3. According to one embodiment, the buoyant material is wood and the non-buoyant material is lead. However, other combination of materials known in the art may be suitable. As can be appreciated by a person skilled in the art, the different density of various materials greatly influences the proper distribution of buoyant and non-buoyant material required to achieve a proper center of balance. Nevertheless, a person skilled in the art may readily obtain a desired center of balance by trial and error, by mathematical modeling, or by determining a lure's center of balance experimentally and using that position as the lure's contact point.

Figure 3:
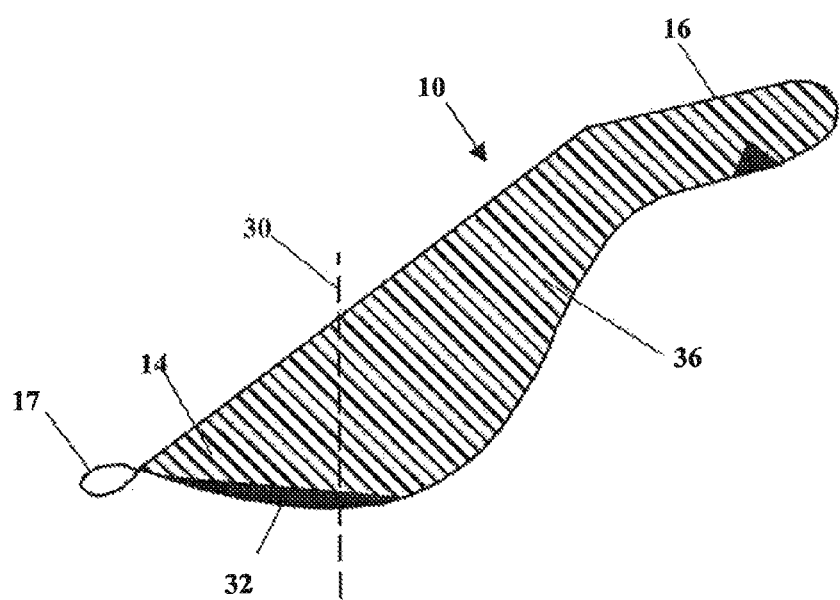
FIG. 3 is a side view of a cross-section of a fishing lure according to one embodiment of the present invention.

FIG. 3 shows the cross section of a lure 10, whereby the light section 36 represents buoyant materials, and dark sections 32 and 34 represent non-buoyant materials or weights. As per the above, the distribution of buoyant and non-buoyant materials shown in FIG. 3 is merely provided as an example because any such distribution depends heavily on the relative density of the materials used, as well as the specific shape of the lure, and the present invention is not limited to any particular distribution.

As can be appreciated from FIG. 3 however, the weighted material is concentrated on the bottom side of the lure, making it bottom-heavy. This ensures that the lure does not go "belly-up" while in the water, and allows the slightest turbulence in the water to cause the lure to wobble as desired.

In a preferred embodiment, the lure is heavier near the head portion 14. This implies that the lure's center of balance is closer to the head portion 14 than the tail portion 16. This provides two advantages: firstly, by having a heavier head portion, the lure is generally oriented with the head lower than the tail, thereby more closely resembling a common behavior of a minnow as it feeds off a bottom surface; secondly, by having the center of balance closer to the head portion 14 than the tail portion 16, it increases the wobble action in the lighter tail portion 16, thereby more closely resembling the natural movement of a minnow's tail; and thirdly, the heavier head portion 14 positions the lure at an angle on a bottom surface, thereby increasing its visibility to predatory fish.

In yet another preferred embodiment, the lure is head-heavy but nevertheless contains non-buoyant material in the tail portion 16. The presence of non-buoyant material in the tail 16 has the desirable effect of increasing the wobble in the lure as it rests on a bottom surface 5. This may require the head portion 16 to include additional weight so as to cancel out the effect of the non-buoyant material in the tail portion 14 on the lure's center of balance 30.

In operation, the lure may be dragged through the water as a conventional lure, but to take full advantage of this lure's innovative features, the lure must be allowed to rest on the bottom surface of whichever body of water it is being used in. As the lure 10 settles on the bottom surface 5, as seen in FIG. 2, the bottom-heavy nature of the lure ensures that it is properly oriented. When the pedestal 20 touches the bottom surface 5, the lure will have the tendency to remain balanced on the pedestal tip 25, as tip 25 is aligned with the lure's center of balance. From this semi-stable position, the lure 10 is wobbled by any turbulence in the surrounding waters, thereby imitating the behavior of a minnow at rest and enticing predatory fish to eat it.

The invention claimed is:

1. A fishing lure, comprising:
   a body, wherein the body has a front end, a back end, a top side, and a bottom side;
   a hook, attached to said body;
   fishing line attachment means attached to the body;
   a pedestal, attached to said bottom side of said body, wherein said pedestal terminates at its lowermost point into a single ground engaging contact point;
   wherein said body is composed of a combination of buoyant material and non-buoyant material, such that the lure's center of balance is aligned with said single contact point.

2. The fishing lure of claim 1, wherein said lure is bottom-heavy.

3. The fishing lure of claim 1, wherein said lure is head-heavy.

4. The fishing lure of claim 1, wherein said body has the appearance of a small bait fish.

5. The fishing lure of claim 1, wherein said buoyant material is wood.

6. The fishing lure of claim 1, wherein said non-buoyant material is lead.

7. The fishing lure of claim 1, wherein said body is symmetrical along its longitudinal axis.

\* \* \* \* \*